(12) United States Patent
Samenayre et al.

(10) Patent No.: US 8,192,575 B2
(45) Date of Patent: Jun. 5, 2012

(54) PROCESS FOR MOUNTING A METAL PART IN A COMPOSITE MATERIAL PART

(75) Inventors: Jacques Samenayre, Bordeaux (FR); François Bruel, Cugnaux (FR)

(73) Assignee: Capaero, Capian (FR)

( * ) Notice: Subject to any disclaimer, the term of this patent is extended or adjusted under 35 U.S.C. 154(b) by 222 days.

(21) Appl. No.: 12/504,114

(22) Filed: Jul. 16, 2009

(65) Prior Publication Data

US 2010/0012270 A1    Jan. 21, 2010

(30) Foreign Application Priority Data

Jul. 16, 2008 (FR) ...................................... 08 54825

(51) Int. Cl.
*B29C 65/02* (2006.01)
(52) U.S. Cl. ......................................... 156/293; 156/83
(58) Field of Classification Search .................. 156/293, 156/83
See application file for complete search history.

(56) References Cited

U.S. PATENT DOCUMENTS

| | | | | |
|---|---|---|---|---|
| 4,940,852 A | * | 7/1990 | Chernack | 523/211 |
| 5,253,947 A | * | 10/1993 | Petrzelka et al. | 403/274 |
| 5,310,434 A | * | 5/1994 | Vives et al. | 156/92 |
| 2008/0012329 A1 | * | 1/2008 | Dewhirst | 285/382 |
| 2009/0014212 A1 | * | 1/2009 | Malak | 174/75 C |

FOREIGN PATENT DOCUMENTS

| | | |
|---|---|---|
| EP | 0 332 069 | 9/1989 |
| EP | 0 511 843 | 11/1992 |
| FR | 2 668 216 | 4/1992 |
| GB | 2 435 317 | 8/2007 |

OTHER PUBLICATIONS

Bihan Amaud et al., "A study of polymerization of thermosetting polymer, and of a microencapsulated peroxide curing agent", XP002513571, [Online] http://cat.inist.fr/?aModele=afficheN&cpsidt=187657, pp. 1 and 2.
French Search Report dated Feb. 5, 2009, from corresponding French application.

\* cited by examiner

*Primary Examiner* — Khanh P Nguyen
*Assistant Examiner* — Vishal I Patel
(74) *Attorney, Agent, or Firm* — Young & Thompson

(57) ABSTRACT

A process for mounting a metal part in a composite material part that belongs in particular to an aircraft subassembly, whereby the metal part includes at least one hollow portion and includes an inside wall that is identical in shape to its outside contour, whereby the inside wall and the outside contour are separated by the thickness of the portion, whereby the portion is pre-coated by glue and the composite material part includes at least one housing for receiving the inside profile that is a mirror image of the outside contour of the portion of the metal part, characterized in that the mounting process calls for ensuring an expansion of the inside wall of the portion that gives rise to an expansion of its outside contour and that determines the expansion forces applied by the portion against the wall of the housing.

22 Claims, 3 Drawing Sheets

PROCESS FOR MOUNTING A METAL PART IN A COMPOSITE MATERIAL PART

BACKGROUND OF THE INVENTION

1. Field of the Invention

Figure 1A:
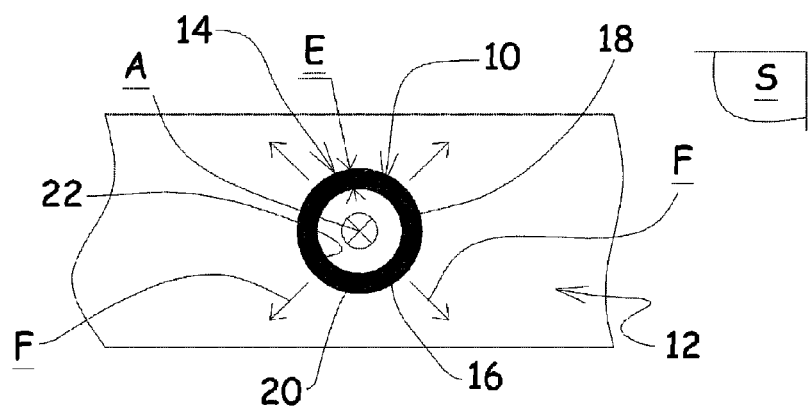

This invention relates to a process for mounting a metal part in a composite material part that belongs in particular to an aircraft subassembly.

2. Description of the Related Art

Aircraft is defined as an airplane, a helicopter, any aerodyne craft that can operate within the Earth's atmosphere, or any space vehicle.

An aircraft comprises numerous parts that form various sub-assemblies that are assembled with one another.

These parts and these sub-assemblies are made integral with one another by means of various connections that are rigid or that allow certain degrees of freedom.

Some of these sub-assemblies are subjected to significant mechanical stresses and to a large number of cycles of use over the life of an aircraft.

For example, landing gear of an aircraft generally consists of numerous parts and sub-assemblies whose kinematics allows said gear to extend into/retract from a compartment box that is provided inside the fuselage or wings. This kinematic assembly, whereby axles support the wheels as far as the actuating cylinder, must withstand and damp numerous landing impacts.

Consequently, the design of the various parts and the implementation of the connections between said parts that are involved in the assembly of these particularly stressed sub-assemblies require the use of resistant materials that are manufactured and machined with great precision and optimized processes that leave no parameter to chance.

However, despite improvements made in the modeling of the properties of the materials and connections between parts and the processing of new materials, certain components and certain connections become damaged and should be replaced during maintenance operations, sometimes for repair work and sometimes for preventive maintenance in anticipation of fatigue in a material or wear and tear on a contact surface.

Various processes of the prior art have therefore been developed so as to improve the mechanical characteristics and to extend the service life of the parts and connections of the aircraft sub-assemblies.

It is possible to cite, for example, the connections that comprise at least one hole that is made in one part.

A first process of the prior art that aims at improving the mechanical characteristics of the material around a hole of a metal part rests on the creation of residual compression stresses around said hole, which makes it possible to increase fatigue life and corrosion resistance.

More specifically, this first process, which is known as "cold-working," consists in cold-working the material; said cold-working is accomplished using a burnisher and a slit ring. Said slit ring is withdrawn after going through the burnisher and embossing the material, and then the hole is rebored for final sizing.

There are also other cold expansion processes such as ringless expansion with a slit burnisher, or else by perforation.

A second process of the prior art, used in both production and maintenance, consists in permanently installing a metal ring by cold expansion in a hole of a metal part.

More precisely, this second process, called cold-expansion ringing, consists in:

expanding said metal ring in the hole using a burnisher so as to introduce residual compression stresses in the metal material around the hole, and leaving said metal ring in the hole so as to ensure a strong mechanical interference, i.e., a tightening, whereby the residual compression stresses ensure, in the mounting of the ring, a high resistance to detachment by traction/compression and rotation.

Of course, the metal ring can then be rebored to a specific size.

Whereby the modeling by finished elements of the properties of metal materials allow simulations that are very close to reality, the parameters for production of these two processes of the prior art are fully known and adjusted.

However, although they are widely used even now, these two processes of the prior art only make it possible to improve the mechanical characteristics and to extend the service life of a connection that comprises a hole that is made in a metal part.

Already today and even more in the future, among the secondary parts and even the primary parts of the aircraft, or parts that belong to the structure of the aircraft, increasingly parts made of composite material will replace parts made of metal material in the aircraft sub-assemblies. The problem therefore arises of reinforcing and ensuring repair possibilities of the connections comprising a hole in a composite material part of an aircraft sub-assembly, including in a part that belongs to the structure of the aircraft and is able to be greatly stressed.

A known process of the prior art that addresses this problem calls for reinforcing a hole that is made in a composite material part by mounting a metal ring in said hole.

According to this process, the mounting of said metal rings is carried out by means of an adhesive that is applied on the outside wall of said ring before it is inserted into said hole.

The sealing of a metal ring by means of an adhesive provides good resistance to detachment forces, but it cannot be considered as a mounting process that leads to long-lasting and sufficiently homogeneous performances.

In addition, the application of the adhesive on the outside wall of the ring just before its mounting and the bonding procedure are dependent on the operator, the manipulation being difficult to accomplish.

Another solution of the prior art calls for inserting the metal ring by co-curing during the production of the composite material part; this solution gives rise to costly and difficult implementation procedures.

SUMMARY OF THE INVENTION

Also, this invention aims at remedying the drawbacks of the prior art by proposing a process for mounting a metal part in a composite material part, in particular an aircraft sub-assembly, likely to ensure consistent performance and ease of use while offering resistance to detachment forces, by traction/compression and by rotation, and a service life that is longer than that of the mounting processes of the prior art.

For this purpose, the invention has as its object a process for mounting a metal part in a composite material part that belongs in particular to an aircraft subassembly, whereby said metal part comprises at least one hollow portion and comprises an inside wall that is identical in shape to its outside contour, whereby said inside wall and said outside contour are separated by the thickness of the portion, whereby said portion is pre-coated by glue on its outside periphery and said composite material part comprises at least one housing for receiving the inside profile that is a mirror image of the outside contour of the portion of the metal part, whereby the mounting process calls for ensuring an expansion of the inside wall of said portion giving rise to an expansion of its outside contour and determining the expansion forces applied by said portion against the wall of the housing.

Thus, the invention opposes a preconceived idea according to which the creation of a connection between a metal part and a composite material part cannot use an expansion stage of said metal part in a housing of said composite material part without running the risk of deteriorating and reducing the quality of the assembly.

BRIEF DESCRIPTION OF THE DRAWING FIGURES

Figure 1B:
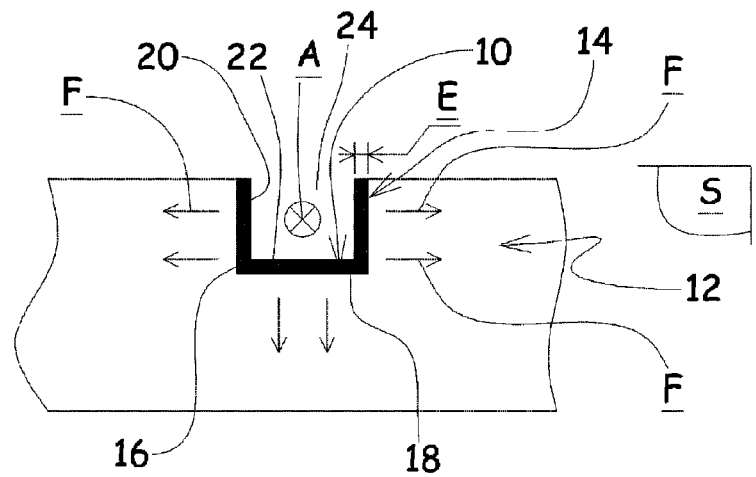
Figure 1C:
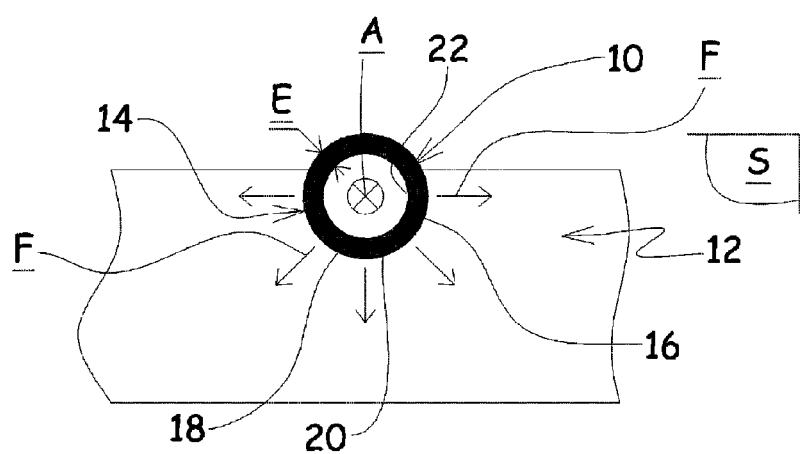
Figure 2:
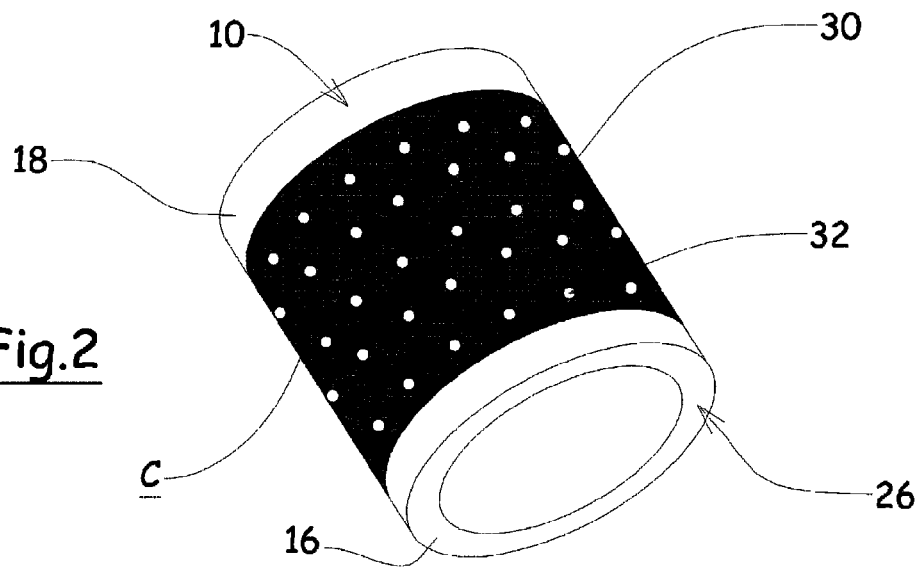
Figure 3A:
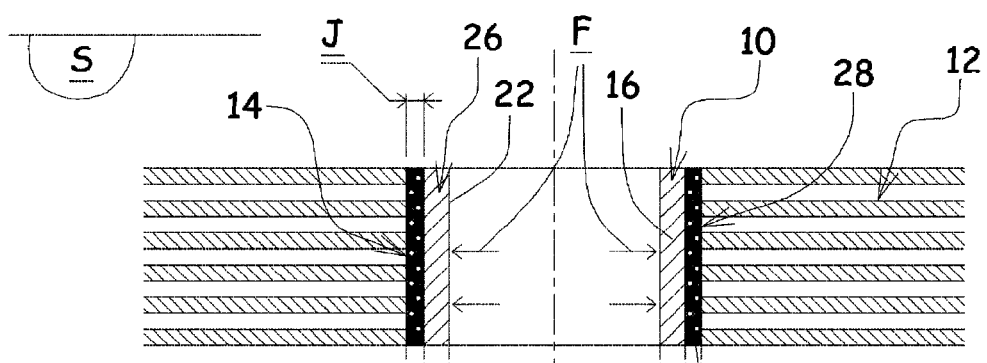
Figure 3B:
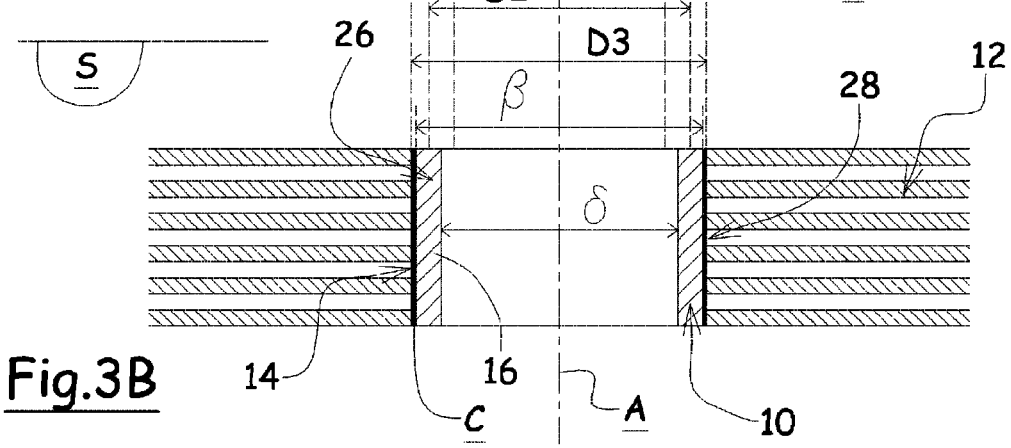

Other characteristics and advantages will emerge from the following description of the invention, a description that is provided only by way of example, taking into account the accompanying drawings in which:

FIGS. 1A, 1B and 1C diagrammatically show three different embodiments of the mounting of a metal part in a composite material part that is produced using the process according to the invention, FIGS. 2, 3A and 3B show a preferred embodiment of the mounting of a metal ring in a hole of a composite material part using the process according to the invention.

Figure 4:
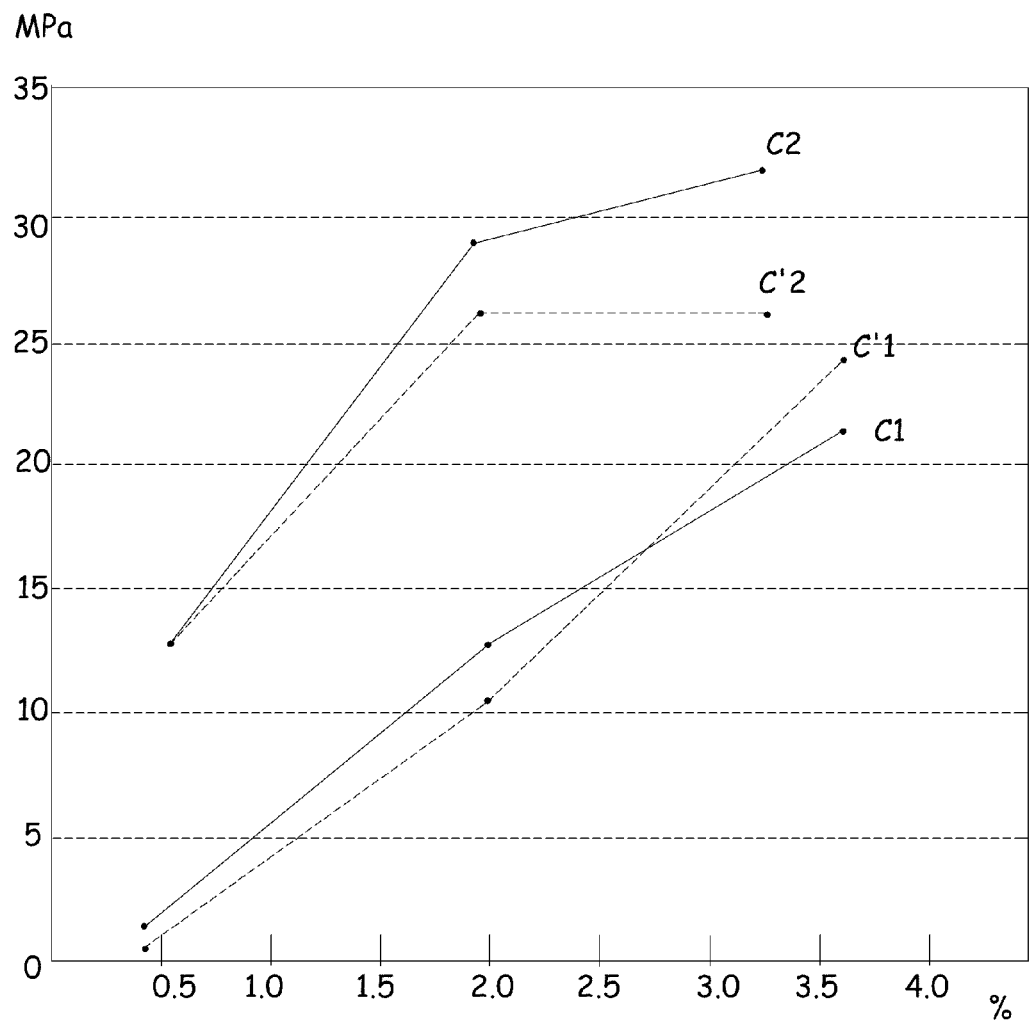

FIG. 4 shows the resistances to detachment of various mountings of a metal part in a composite material part that are produced using the process according to the invention.

DETAILED DESCRIPTION OF THE INVENTION

As illustrated in FIGS. 1A, 1B and 1C, the invention relates to a process for mounting a metal part 10, shown in a plane that is transversal to said figures, in a composite material part 12.

The process according to the invention is particularly designed to reinforce and to increase the service life of a connection of a composite material part that belongs to an aircraft sub-assembly.

More specifically, it gives rise to a process for mounting a metal part 10 in a receiving housing 14 that is provided for this purpose in a composite material part 12.

For this purpose, the receiving housing 14 has an inside profile 20 that is essentially a mirror image of the outside contour 18 of a portion 16 of the metal part 10, whereby said portion 16 comes into contact with the composite material.

According to the invention, the metal part 10 can comprise other portions that are connected to the portion 16 and that may or may not come into contact with the composite material part 12, or, on the contrary, said metal part 10 can consist only of said portion 16.

In a first stage, the mounting process according to the invention calls for pre-coating by glue C the portion 16 of said metal part 10 before introducing it into the receiving housing 14, whereby the glue C can cover all or part of the outside contour 18 of said portion 16.

In a second stage, after the portion 16 is inserted into the housing 14, the mounting process according to the invention consists in expanding the outside contour 18 of the portion 16 in the housing 14 of the composite material part 12.

In a preferred embodiment of the invention, the receiving housing 14 and the portion 16 of the metal part 10 are arranged along a longitudinal axis A that is essentially perpendicular to the stratification plane S of the composite material so that the forces originating from the expansion are in said stratification plane S.

In addition, the expansion of the outside contour 18 is carried out so as not to produce or to limit damage within the composite material around the receiving housing 14.

In a preferred embodiment of the invention, and as shown in FIGS. 1A to 1C, the portion 16 of said metal part 10 is hollow and comprises an inside wall 22 with a shape that is approximately identical to the outside contour 18, whereby said inside wall 22 and said outside contour 18 are separated by the thickness E of the portion 16 of the metal part 10.

Still in a preferred embodiment, an expansion tool, in particular a burnisher, is inserted into the portion 16 of said metal part 10 after its installation in the receiving housing 14.

So as to achieve the expansion of the outside contour 18 in the receiving housing 14, the expansion tool comprises, for example, a cross-section that is variable over its length and with a shape that is essentially identical to the inside wall 22 of the portion 16 of the metal part 10.

Later, said expansion tool is inserted into said hollow part 16 by its end with the smallest section, and force is applied on said tool so as to make it penetrate into said hollow portion, whereby the increase in the section of the tool makes it possible to gradually apply a pressure that is distributed over the inside wall 22 and directed toward the outside, as the arrows F illustrate.

The use of an expansion tool with a variable section is cited by way of example; other solutions that are known to one skilled in the art exist, such as, for example, compression of the portion 16 of the part 10 in its length in the manner of a riveting. The most suitable solution that depends on the connection to be reinforced, the selection between the various solutions, is left to one skilled in the art.

Advantageously, metal portions 16 of various cross-sections can be mounted using the process according to the invention in a housing 14 for receiving a composite material part 12.

Thus, in a preferred embodiment of the invention, the portion 16 of the metal part 10 is hollow and has a closed outside contour 18, as illustrated in FIGS. 1A and 1C, whereby said outside contour 18 comes in the form of a continuous surface.

With a closed outside contour 18, the lateral expansion, in the case of an essentially polygonal contour 18, or radial expansion, in the case of an essentially circular contour 18, of the metal portion 16 is better controlled, and therefore the deformation of said portion 16 in the housing 14 of the composite material part 12 is more homogeneous.

According to another embodiment of the invention, illustrated in FIG. 1B, and for the needs of certain connections, such as, for example, slides, said metal portion 16 can be hollow and have a half-open outside contour 18, whereby the inside wall 22 and the outside contour 18 come in the form of discontinuous surfaces that leave at least one longitudinal opening 24 in the portion 16 of said metal part 10.

As shown in FIGS. 1A to 1C, the housing 14 for receiving the composite material part 12 can also assume several shapes.

In a preferred embodiment of the invention, illustrated in FIG. 1A, the housing 14 for receiving the metal part 10 has a closed inside profile 20.

In this way, the composite material part 12 completely surrounds the metal portion 16, thus promoting a homogeneous distribution of the deformation of the portion 16 in the receiving housing 14 and improving the resistance to detachment forces, by traction/compression and by rotation, of the connection between the portion 16 and the composite material part 12.

However, in another embodiment of the invention, and in particular in the above-mentioned case of the production of certain connections such as slides in a composite material part, said receiving housing 14 has a half-open inside profile 20, as illustrated by FIGS. 1B and 1C, whereby the metal portion 16 optionally can be introduced into said housing laterally.

As specified in the preamble, this invention pays particular attention to reinforcing and improving the mechanical characteristics of the connections comprising at least one hole that is made in a composite material part.

For this purpose, in a preferred embodiment of the process for mounting a metal part in a composite material part according to the invention, and as illustrated in FIGS. 2, 3A, and 3B, the portion 16 of the metal part 10 assumes the shape of a ring 26, and the housing 14 of the composite material part 12 assumes the shape of a hole 28 into which said ring 26 is inserted.

Before mounting, the outside contour 18 of the ring 26 is pre-coated by glue C, whereby the hole 28 is produced with a play J that is significant enough to be able to insert said ring 26 that is pre-coated by glue C with no problem, preferably manually.

According to the invention, the glue C that is used comprises a binder 30 in which are found at least one resin and at least one catalyst, whereby at least one of these two products is contained in microcapsules 32.

Preferably, the catalyst is contained in the microcapsules 32, of 20 to 30 microns to provide a connection, and the resin is found in the binder.

Advantageously, a solvent, in particular toluene, is contained in the binder so as to ensure a certain viscosity of the glue C that is designed to allow the coating of the ring 26 by quenching, casting or brushing.

The ring 26 that is coated by glue C is then dried at ambient temperature or in an oven so as to produce the evaporation of the solvent and to attach the glue C.

The thus deposited glue C can remain inert over a long period. This allows a pre-coating of the rings 26 during a production in series, for example. As soon as their drying is carried out, said pre-coated rings 26 can be packed, sent and stored without loss of performance levels, for at least one year, to provide a connection.

During the mounting of the metal ring 26 in the hole 28, the glue C is therefore inert, causing no difficulty in handling for the operator and no overflow or contamination of the surrounding parts.

Later, during the use of the expansion tool, the radial expansion of the outside contour 18 of the ring 26 in the hole 28 breaks the microcapsules and thus causes the chemical reaction between the resin and the catalyst.

More generally, in the process according to the invention, the lateral expansion of the outside contour 18 of the portion 16 of the metal part 10 in the housing 14 for receiving the composite material part 12 causes the polymerization of the glue C.

An important function of the expansion of the ring 26 in the mounting process according to the invention is to break the largest proportion, ideally all, of the microcapsules.

According to two variant embodiments of the mounting according to the invention, the ring 26 that is described above can have a smooth or else knurled outside surface so as to also improve the resistance to detachment forces in rotation.

Said knurling makes it possible to improve the mechanical bonding between the glue C and the metal part 10, whereby the adhesion of the glue C with a composite material is generally better than the adhesion of the glue C with the metal.

According to the invention, a pressure that is distributed over the inside wall 22 of the ring 26 is applied, whereby said pressure is directed toward the hole 28 as the arrows F illustrate for deforming and expanding said ring 26 in said hole 28.

Before expansion, the ring 26 has an inside diameter D1 and an outside diameter D2, the hole has a diameter D3, with D2 less than D3 because of the play J that allows the insertion of the ring 26 that is pre-coated by glue C.

Using the expansion tool, the mounting process according to the invention calls for ensuring an expansion 6 of the inside diameter D1 that gives rise to a plasticization of the material in the internal portion with thickness E of the ring 26.

Advantageously, said plasticization gives rise to a better fatigue strength of the mounting that is produced using the process according to the invention.

The plasticization of the internal portion with thickness E introduces residual stresses in the material of said ring 26. These stresses give rise to an expansion β of the outside diameter D2, whereby said expansion β determines the radial expansion forces that are applied by the ring 26 against the wall of the hole 28.

More specifically, the mounting process according to the invention calls for producing an expansion 6 of the inside diameter D1 that can give rise to an expansion β of the outside diameter D2 that is at least equal to the diameter D3 if said expansion 6 is produced without having mounted said ring 26 in the hole 28, i.e., without opposition forces applied by the composite material part 12 against the expansion forces of the ring 26 at the hole 28.

Thus, the objective of the mounting process according to the invention is to vary the expansion 6 of the inside diameter D1 so as to adjust the expansion forces of the ring 26 and the opposition forces of the composite material part 12 based on mechanical properties of the material of said ring 26 and the composite material.

Also, in a first variant embodiment of the process according to the invention whose purpose is to prevent any damage, in particular delamination, of the composite material part 12, the expansion 6 of the inside diameter D1 is such that the expansion β of the outside diameter D2 gives rise to non-zero opposition forces applied by the composite material part 12 against the expansion forces of the ring 26 at the hole 28 and such that the expansion forces are approximately equal to the opposition forces that are applied by the composite material part 12 at the hole 28 without D3 varying significantly.

And, in a second variant embodiment of the process according to the invention, the expansion β of the inside diameter D1 is such that the expansion β of the outside diameter D2 gives rise to non-zero opposition forces that are applied by the composite material part 12 against the expansion forces of the ring 26 at the hole 28 and such that the expansion forces are significantly greater than the opposition forces that are applied by the composite material part 12 at the hole 28 without D3 varying significantly.

According to this second variant embodiment, stresses are created in the composite material around said receiving housing 14 in addition to the residual stresses that are created in the ring 26, which makes it possible to increase the mechanical characteristics of the mounting, in particular the resistance to detachment forces, by traction/compression and by rotation.

By way of example, FIG. 4 illustrates the evolution, during actual tests, of resistances to detachment of two variant embodiments of the mounting according to the invention, with a smooth or knurled ring, based on the increase in the expansion factor of the inside diameter D1 of the ring 26.

More specifically, the curves C1 and C1' correspond to the resistances to detachment, respectively under an action and under a detachment torque, of a metal ring with a smooth outside surface, whereby said ring is glued and expanded in a composite material part according to the invention.

The curves C2 and C2' correspond to the resistances to detachment, respectively under an action and under a detachment torque, of a metal ring with a knurled outside surface, whereby said ring is glued and expanded in a composite material part according to the invention.

The resistances to detachment are measured in megapascals (MPa) for various expansion factors of the inside diameter D1.

The expansion factor corresponds, in percent, to the sustained increase in the diameter D1 after the expansion tool passes through and withdraws.

It is therefore noted that the resistance to detachment greatly increases with the increase in the expansion factor.

It therefore appears that by combining the effects of gluing with those of interference mounting, the process according to the invention makes it possible to carry out a mounting of a metal part in a composite material part that has better mechanical characteristics, in particular a better transfer of radial and axial loads, whereby the mountings that are obtained with the processes of the prior art use only gluing.

In addition, the radial expansion of the ring 26 advantageously makes it possible to center said ring in the hole 28 without any specific mounting, contrary to the gluing processes of the prior art, in which the diameter play left for the thickness of the glue joint required specific mounting procedures to control the position of the ring in the hole.

During an expansion of the portion 16, or a ring 26, inducing a deformation of the inside profile 20 of the housing 14, or a hole 28, damage, in particular a slight delamination, can be caused in the composite material close to said housing 14. Advantageously, this damage can be immediately offset during said expansion of the portion 16 or the ring 26 by an infiltration and a polymerization of the glue C.

To provide a connection, so as not to reduce the resistance of the composite material part 12 and therefore the performance level of the assembly, the sustained expansion of the inside diameter D1 is preferably less than 5% of its nominal value.

It is therefore noted that the efficiency of the mounting process according to the invention is based on the knowledge of the strengths and mechanical properties of the portion 16 of the metal part 10 and the composite material of the part 12 around the housing 14.

Thus, the mounting process according to the invention rests on a modeling of various physical phenomena: deformation of the ring 26 and the composite material part 12, plasticization of the ring 26, damage of the composite material, friction between the expansion tool and the ring 26, compression of the glue C before and during polymerization, . . . .

Whereby the methods for modeling the mechanical properties of the materials improve constantly and the results of the simulations are becoming more refined owing to the increase in computing capacity, the process for mounting a metal part in a composite material according to the invention can be adapted and optimized for numerous uses, including for the most demanding ones such as the use of a composite material part in an aircraft sub-assembly.

Thus, the mounting process according to the invention offers an ease of use and the possibility of modulating the expansion level so as to adapt to the geometry of the composite material part, in particular for being able to demonstrate the assembly in a field such as aeronautics.

Of course, the invention covers any assembly of a metal part in a composite material part that is produced or inspired starting from the mounting process that was just described, in the application that was used as an example in this description or in any other application.

In particular, the invention covers the assembly of a metal ring with a collar in a hole that is made of a composite material part, whereby this type of assembly is frequently used.

It is obvious that the mounting process that was just described can also be adapted to the mounting of a non-metal part that has elastic and plastic properties, in a composite material or metal part, whereby said composite material can be a so-called complex material.

The invention claimed is:

1. A process for mounting a metal part (10) in a composite material part (12), comprising:
    pre-coating at least one hollow portion (16) of the metal part (10) with a glue C, where said metal part (10) comprises the at least one hollow portion (16) and an inside wall (22) that is identical in shape to an outside contour (18) of the portion (16), and said inside wall (22) and said outside contour (18) are separated by a thickness E of the portion (16), and said composite material part (12) comprises at least one housing (14) for receiving an inside profile (20) that is a mirror image of the outside contour (18), and said composite material part (12) comprises different layers made of different constituents, and said different layers are parallel to a stratification plane S, where the receiving housing (14) and the portion (16) of the metal part (10) are arranged along a longitudinal axis A that is essentially perpendicular to the stratification plane S of the composite material and to the different layers of the composite material part; and
    ensuring an expansion δ of the inside wall (22) of the portion (16) that gives rise to an expansion β of the outside contour and that determines the expansion forces applied by the portion (16) against a wall of the housing (14) in a stratification plane S of the composite material.

2. The process for mounting a metal part in a composite material part (12) according to claim 1, wherein the expansion δ of the inside wall (22) gives rise to a plasticization of the internal portion with thickness E of the portion (16) and introduces residual stresses into a material of the portion (16) that gives rise to the expansion β and determines the expansion forces that are applied by the portion (16) against the wall of the housing (14).

3. The process for mounting a metal part (10) in a composite material part (12) according to claim 1, wherein the portion (16) of the metal part (10) assumes a shape of a ring (26) and the housing (14) of the composite material part (12) assumes a shape of a hole (28) into which said ring (26) that is pre-coated by glue C is inserted.

4. The process for mounting a metal part (10) in a composite material part (12) according to claim 3, wherein the ring (26) has an inside diameter D1 and an outside diameter D2, the hole has a diameter D3, with D2 less than D3 because of play J that allows the insertion of the ring (26) that is pre-coated by glue C, wherein the expansion δ of the inside diameter D1 is such that the expansion β of the outside diameter D2 gives rise to non-zero opposition forces that are applied by the composite material part (12) against expansion forces of the ring (26) at the hole (28) and wherein the expansion forces are equal to opposition forces that are applied by the composite material part (12) at the hole (28) without D3 varying.

5. The process for mounting a metal part (10) in a composite material part (12) according to claim 3, wherein the ring (26) has an inside diameter D1 and an outside diameter D2, and the hole has an inside diameter D3, with D2 less than D3 because of play J that allows the insertion of the ring (26) that is pre-coated by glue C, wherein the expansion δ of the inside diameter D1 is such that the expansion β with the outside diameter D2 gives rise to non-zero opposition forces that are applied by the composite material part (12) against the expansion forces of the ring (26) at the hole (28) and wherein the expansion forces are greater than the opposition forces that are applied by the composite material part (12) at the hole (28) without D3 varying.

6. The process for mounting a metal part (10) in a composite material part (12) according to claim 3, wherein the ring (26) has a knurled outside surface.

7. The process for mounting a metal part (10) in a composite material part (12) according to claim 1, wherein an expansion tool is inserted into said metal portion (16) for ensuring the expansion of the outside contour (18) of said portion (16).

8. The process for mounting a metal part (10) in a composite material part (12) according to claim 1, wherein the expansion of the outside contour (18) of the portion (16) into the housing (14) causes polymerization of the glue C.

9. The process for mounting a metal part (10) in a composite material part (12) according to claim 1, wherein the glue C comprises a binder (30) in which there are found at least one resin and at least one catalyst, and at least one of the resin or the catalyst is contained in microcapsules (32).

10. The process for mounting a metal part (10) in a composite material part (12) according to claim 2, wherein the portion (16) of the metal part (10) assumes a shape of a ring (26) and the housing (14) of the composite material part (12) assumes a shape of a hole (28) into which said ring (26) that is pre-coated by glue C is inserted.

11. The process for mounting a metal part (10) in a composite material part (12) according to claim 4, wherein the ring (26) has a knurled outside surface.

12. The process for mounting a metal part (10) in a composite material part (12) according to claim 5, wherein the ring (26) has a knurled outside surface.

13. The process for mounting a metal part (10) in a composite material part (12) according to claim 2, wherein an expansion tool is inserted into said metal portion (16) for ensuring the expansion of the outside contour (18) of said portion (16).

14. The process for mounting a metal part (10) in a composite material part (12) according to claim 2, wherein the expansion of the outside contour (18) of the portion (16) into the housing (14) causes the polymerization of the glue C.

15. The process for mounting a metal part (10) in a composite material part (12) according to claim 2, wherein the glue C comprises a binder (30) in which there are found at least one resin and at least one catalyst, whereby at least one of these two products is contained in microcapsules (32).

16. The process for mounting a metal part (10) in a composite material part (12) according to claim 1, wherein the metal part (10) and the composite material part (12) belong to an aircraft subassembly.

17. A process for mounting a metal part (10) in a composite material part (12) that belongs to an aircraft subassembly, comprising:
pre-coating at least one hollow portion (16) of the metal part (10) with a glue C, where said metal part (10) comprises the at least one hollow portion (16) and an inside wall (22) that is identical in shape to an outside contour (18) or the portion (16), and said inside wall (22) and said outside contour (18) are separated by the thickness E of the portion (16), and said composite material part (12) comprises at least one housing (14) for receiving an inside profile (20) that is a mirror image of the outside contour (18), and said composite material part (12) comprises different layers made of different constituents, and said different layers are parallel to a stratification plane S, where the receiving housing (14) and the portion (16) of the metal part (10) are arranged along a longitudinal axis A that is essentially perpendicular to the stratification plane S of the composite material and to the different layers of the composite material part; and
ensuring an expansion δ of the inside wall (22) of the portion (16) that gives rise to an expansion β of the outside contour and that determines the expansion forces applied by the portion (16) against a wall of the housing (14) in a stratification plane S of the composite material.

18. The process for mounting a metal part in a composite material part (12) that belongs to an aircraft subassembly according to claim 17, wherein the expansion δ of the inside wall (22) gives rise to a plasticization of the internal portion with thickness E of the portion (16) and introduces residual stresses into a material of the portion (16) that gives rise to the expansion β and determines the expansion forces that are applied by the portion (16) against the wall of the housing (14).

19. The process for mounting a metal part in a composite material part (12) according to claim 1,
wherein the receiving housing (14) is a hole made essentially perpendicularly through the different layers of the composite material part (12),
and the wall of the housing (14) is formed by the cut surfaces of the different layers, said surfaces being generated with the making of said hole in the composite material part (12).

20. The process for mounting a metal part in a composite material part (12) according to claim 1,
wherein the composite material part (12) is a plane part essentially parallel to the stratification planes, and the longitudinal axis A of the receiving housing (14) is essentially perpendicular to the plane composite material part (12).

21. The process for mounting a metal part in a composite material part (12) that belongs to an aircraft subassembly according to claim 17,
wherein the receiving housing (14) is a hole made essentially perpendicularly through the different layers of the composite material part (12),
and the wall of the housing (14) is formed by the cut surfaces of the different layers, said surfaces being generated with the making of said hole in the composite material part (12).

22. The process for mounting a metal part in a composite material part (12) that belongs to an aircraft subassembly according to claim 17,
wherein the composite material part (12) is a plane part essentially parallel to the stratification planes, and the longitudinal axis A of the receiving housing (14) is essentially perpendicular to the plane composite material part (12).

* * * * *